United States Patent [19]

Ferguson

[11] Patent Number: 5,587,940
[45] Date of Patent: Dec. 24, 1996

[54] NON-HEURISTIC DECIMAL DIVIDE METHOD AND APPARATUS

[75] Inventor: David E. Ferguson, Fawnskin, Calif.

[73] Assignee: Amalgamated Software of North America, Inc., Big Bear Lake, Calif.

[21] Appl. No.: 152,423

[22] Filed: Nov. 12, 1993

[51] Int. Cl.⁶ ..................................................... G06F 7/52
[52] U.S. Cl. .......................................... 364/762; 364/761
[58] Field of Search .................................. 364/761, 762, 364/763, 764, 765, 766, 767

[56] References Cited

U.S. PATENT DOCUMENTS

| | | | |
|---|---|---|---|
| 3,234,366 | 2/1966 | Davis et al. | 364/763 |
| 3,578,961 | 5/1971 | Miu | 364/763 |
| 3,591,787 | 7/1971 | Freiman | 364/767 |
| 3,735,107 | 5/1973 | Bolt et al. | 364/763 |
| 3,736,413 | 5/1973 | Ferguson | 364/761 |
| 5,357,455 | 10/1994 | Sharangpani et al. | 364/767 |

*Primary Examiner*—Roy N. Envall, Jr.
*Assistant Examiner*—Emmanuel L. Moise
*Attorney, Agent, or Firm*—Fish & Richardson P.C.

[57] ABSTRACT

A method and apparatus for performing decimal division using a computer that does not have the capability to perform single instruction decimal multiplication or division. A divisor is normalized such that the value of the first digit of the divisor is not less than 5. Trial quotient digits within a trial quotient table are predetermined. A multiples table comprises multiples of the normalized divisor. The most significant digits of the normalized divisor and the most significant digits of each partial dividend are used to locate trial quotient digits within the trial quotient digit table. The trial quotient digits are used to locate multiples within the multiples table. A single subtraction (or addition) operation from a partial dividend can be used to determine whether the trial quotient digit is the actual quotient digit.

13 Claims, 5 Drawing Sheets

FIG. 2

MULTIPLES TABLE

| MULTIPLIER | MULTIPLE |
|---|---|
| 0 | 0 |
| 1 | ND |
| 2 | 2 x ND |
| 3 | 3 x ND |
| 4 | 4 x ND |
| 5 | 5 x ND |
| 6 | 6 x ND |
| 7 | 7 x ND |
| 8 | 8 x ND |
| 9 | 9 x ND |

NON-HEURISTIC DECIMAL DIVIDE METHOD AND APPARATUS

BACKGROUND OF THE INVENTION

1. Field of the Invention

This invention relates to a method and apparatus for dividing decimal numbers, and more particularly, to an efficient method and apparatus for dividing decimal numbers using a computer which lacks an instruction for either division or multiplication.

2. Description of Related Art

In the past, a simple method for performing long division by a programmed computer subtracted a divisor from a dividend until the result of the subtraction operation was a negative value. The number of subtractions minus 1 yields the quotient. The remainder of the division was determined by adding the divisor to the negative result.

Alternatively, the divisor is repeatedly subtracted from a portion of the dividend comprising a like number of leading digits of the dividend. If the first subtraction is negative, the division is subtracted from a like number of leading dividend digits plus 1. Otherwise, once the result of the subtraction is negative, no further subtractions are performed and the divisor is added to the negative result to attain the remainder. The number of subtractions minus 1 comprises a first digit of the quotient. The process is repeated with the divisor being subtracted from the remainder, and modified by appending additional digits from the original dividend to equal the number of divisor digits. The number of such subtractions minus 1 is appended as a next digit of the quotient.

This improved method for determining the quotient of a division operation is still time consuming due to the large number of subtraction operations that must be performed when dividing a large dividend by a relatively small divisor.

A number of methods have been devised to reduce the number of subtraction or addition operations needed to calculate the quotient (subtraction operations are the equivalent of addition operations for most purposes, and in particular for digital computers). One such method, disclosed in U.S. Pat. No. 3,736,413 issued to the present inventor, is similar to the common manual long division method, in that a trial quotient digit is selected based upon the value of the first digits of the dividend and the divisor. In order to limit the number of potential trial quotient digits, the divisor is normalized to fall within a predetermined range. In the case of a decimal division operation, the divisor is normalized to be greater than or equal to 0.5 and less than 1, and such that the first three digits from left to right of the divisor are greater than 625. The latter normalization characteristic is achieved by multiplying the divisor and the dividend by a common factor, preferably a power of two, until the desired value is obtained. Powers of two are selected to allow the divisor and dividend to each be added to themselves to effect the multiplication operation in a reduced number of addition operations. Normalizing the divisor and the dividend ensures that the trial quotient digit will be within two digits of the actual quotient digit.

Once the divisor is normalized, a trial quotient digit is selected based upon the values of the leading digit of the divisor and the leading digit of the dividend.

However, since the trial quotient digit is only guaranteed to be within two digits of the actual quotient digit, there are times when two tests must be performed to determine which one of three possible quotient digits is the actual quotient digit. Each of these tests includes a subtraction operation.

Because increased speed and efficiency are desirable in computers, it is desirable to reduce the number of steps in the long division process by identifying actual quotient digits more efficiently. The present invention is a method and apparatus which determines actual quotient digits with a single addition or subtraction operation, thus resulting in more efficient computerized long division operation.

SUMMARY OF THE INVENTION

The present invention is a method and apparatus for performing decimal division using a computer that does not have the capability to perform single instruction decimal multiplication or division. The inventive method reduces the number of trial quotient digits to two, thus allowing each actual quotient digit to be determined after performing one addition or substraction operation to identify which of the two trial quotient digits is the actual quotient digit.

In accordance with the present invention, a divisor D having n digits (where $D_i$ indicates the $i^{th}$ digit of the divisor D) is normalized such that the value of the first digit $D_1$ of the divisor is not less than 5. A dividend is denoted as d; where $d_j$ indicates the $j^{th}$ digit of the dividend d. If the value of the first digit $D_1$ is greater than 5, then no normalization is required. Normalization is preferably performed by repeatedly doubling the divisor D until the value of the first digit $D_1$ is equal to or greater than 5. The maximum number of such multiplications is 3.

Two lookup tables are used to perform a decimal division operation in accordance with the present invention. The first table (the trial quotient digit table) comprises trial quotient digit values. In one embodiment of the present invention, the trial quotient digit table is comprised of 10 sub-tables, only one of which is selected for a given divisor. The value of each entry to the trial quotient table is predetermined and is provided below. The second table (the multiples table) comprises multiples of the normalized divisor. In one embodiment of the present invention, all the values of the multiples table are pre-calculated after the divisor is normalized. In an alternative embodiment, the values of the multiples table are calculated as required during the division operation. In the alternative embodiment, calculation of the values may be simplified by using, as a starting point, any values that had been calculated previously in that division operation. For example, if 2×D has been previously calculated, then 3×D can be calculated from 2×D+D.

Once the divisor D has been normalized (if required) and at least the entries to the trial quotient digit table are available, the most significant digits of each partial dividend are used to locate trial quotient digits within the trial quotient digit table. The trial quotient digits are used to locate multiples of the divisor D in the multiples table. A single subtraction (or addition) operation from a partial dividend can be used to determine whether the trial quotient digit is the actual quotient digit. If it is determined not to be the actual quotient digit, then the actual quotient digit is the trial quotient digit minus 1. This process is repeated until M–N+1 digits have been processed, where M is the total number of digits in the divisor, and N is the total number of digits in the first multiple.

If the divisor was normalized, then the final quotient and remainder must be adjusted to compensate for the normalization. Adjustment of the remainder requires multiples of the divisor to be added to (or subtracted from) the remainder.

Adjustment of the quotient requires that the quotient be doubled and incremented or decremented a number of times.

The present invention provides an efficient method and apparatus for performing decimal division in a computer without the use of a single instruction division or multiplication operations.

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

FIG. 2 is an illustration of a multiples table in accordance with the present invention.

Like reference numbers and designations in the various drawings refer to like elements.

DETAILED DESCRIPTION OF THE INVENTION

Figure 1:
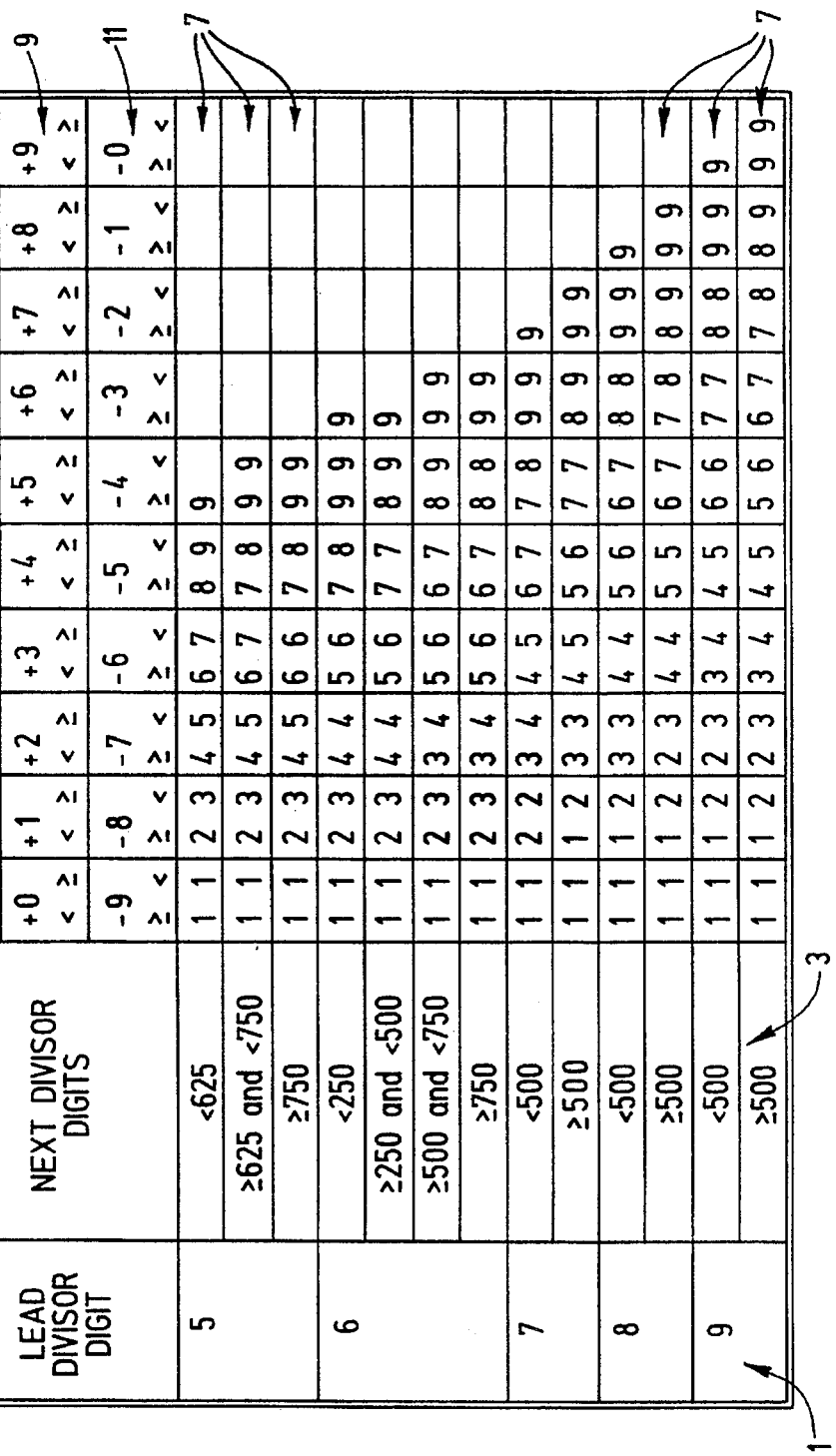
FIG. 1 is a trial quotient digit table in accordance with the present invention.

Throughout this description, the preferred embodiment and examples shown should be considered as exemplars, rather than as limitations on the present invention.

The present invention provides a method and apparatus for performing a division operation without the use of single instruction multiplication or division operation. The present invention relies on a trial quotient digit (TQD) table to predict the value of each digit of a quotient. Throughout the following description, the following symbols are used:

D=the entire divisor;
$D_i$=the $i^{th}$ digit of the divisor D, counting from the MSD (most significant digit);
ND=the entire normalized divisor;
$ND_i$=the $i^{th}$ digit of the normalized divisor ND, counting from the MSD;
N=the total number of digits in the normalized divisor ND;
d=the entire dividend;
$d_j$=the $j^{th}$ digit of the dividend d, counting from the MSD;
n=the total number of digits in the dividend;
S=the entire sub-dividend;
$m_M$=the mth multiple of divisor D;
$m_M^P$=the pth digit of the multiple $^mM$ counting from the MSD;
Q=the entire quotient;
$Q_r$=the $r^{th}$ digit of the quotient Q, counting from the MSD;
R=the result of the subtraction of a multiple from a sub-dividend.

Overview

In accordance with the present invention, a complete quotient Q is calculated by calculating each digit of the quotient Q one at a time by the inventive process. After the value of the quotient Q has been determined, the quotient may require adjustment if the divisor was normalized. Such adjustment eliminates the affect of normalization of the divisor D on the quotient Q. Furthermore, if the division results in a remainder of interest, then that remainder must also be adjusted.

Throughout this description, the operands are considered to be positive, since computation of a sign is conventional. Also, the divisor is assumed to be non-zero.

In the present invention, the quotient digits are each calculated by first selecting a TQD from a predetermined TQD table stored within an electronic storage means, such as a random access memory (RAM) within a computer system. Specification of the range of the divisor D, normalization of the divisor D to ensure that the divisor D is within the specified range, and selection of TQDs from the TQD table using the normalized divisor D and digits of the dividend d cause a selected TQD to be the greater of two consecutive possible quotient digits, one of which is the actual quotient digit. Therefore, either the selected TQD or the TQD minus one is the actual quotient digit. In accordance with the present invention, the TQD can be either verified or eliminated as the actual quotient digit by one addition or subtraction operation. This provides an extremely efficient way to find the actual quotient digit. Furthermore, division can proceed from left to right doing only one n+n digit arithmetic operation on the dividend at each step, where n is the number of digits in the dividend, and an n+n digit arithmetic operation is an addition of each of the n digits in a first addend with a corresponding one of the n digits of a second addend.

The TQD is selected from the TQD table based upon the value of leading digits of the dividend d or sub-dividends S and the divisor D. Because the value of the divisor D does not change throughout the division operation, the number of values within the TQD table that are of interest can be narrowed once the divisor D is known. For the purpose of illustrating the present invention, a TQD sub-table is described. A TQD sub-table need not actually exist apart from the TQD table of the embodiment of the present invention. The TQD sub-table comprises those values from the TQD table that are of interest once the value of the divisor D is known.

TQD Table

FIG. 1 is an illustration of the TQD table used in the preferred embodiment of the present invention when dividing decimal numbers. The TQD table of the preferred embodiment of the present invention comprises 13 sub-tables 7. The first column 1 of the TQD table is labeled "LEAD DIVISOR DIGIT". By examining the value of the leading digit $D_1$ of the divisor D, the number of TQD sub-tables 7 that are relevant to the division operation can be narrowed to 4 or less.

The entries that comprise each TQD sub-table 7 are represented as a unique row of numbers within the TQD table. For example, the numbers "1 1 2 3 4 5 6 7 8 9 9 9" of the TQD table comprise the values that are common to both the TQD table and to a first TQD sub-table 7. Taken together with the first digit of the divisor $D_1$, the next digits $D_2$–$D_4$ of the divisor D are compared to the values in the second column 3 to select a particular TQD sub-table 7 to be used when dividing a dividend d by the divisor D. When there are fewer than 4 digits in the divisor D, those digits which are not present are assumed to be zeros. For example, the first TQD sub-table 7 is used when dividing by a divisor D in which the lead digit $D_1$ is equal to "5" and the next digits $D_2$ through $D_4$ form a number with a value that is between 000 and 625. Thus, if the divisor D is "562", then the fourth digit of the divisor $D_4$ is taken to be a zero for the purpose of determining which TQD sub-table 7 to use.

Therefore, the first TQD sub-table 7 would be used throughout the division operation in which the divisor D equals "562".

The values in each TQD sub-table are paired. Each pair is associated with a positive selection digit 9, and a negative selection digit 11. Once the particular TQD sub-table 7 has been selected, the value of the dividend d is used to select one of a pair of TQD values from the TQD sub-table 7. This process is explained in detail below.

It should be noted that the TQD values shown in FIG. 1 are for use with base 10 numbers. The values of the TQDs within the TQD table can be derived mathematically as follows. Initially, the dividend entries shown in the first column 1 and the second column 3, and the selection digits 9, 11 in the TQD table can be assumed to step in steps equal to half the value of the most significant digit of the lead divisor and the lead dividend, respectively (i.e., half digit steps). Accordingly, there would only be 10 TQD sub-tables, and each would be associated with a lead divisor value from 5–9 in the first column 1 and a second most significant divisor digit having a value that is either less than 5, or greater than or equal to 5 in the second column 3. Since the selection digits 9, 11 and divisor entries 1 step by half digits, derivation of the TQDs is simplified if both the selection digits 9, 11 and divisor entries 1 are doubled. This, of course, does not affect the quotient digits. Dividend values are also multiplied by ten, so that the quotient digits are between 0 and 10. This is necessary since the value of the divisor digits are greater than or equal to the dividend.

Referring to the two most significant digits of the dividend as $_m d$ and the two most significant digits of the divisor as $_m D$, the smallest quotient digit for a dividend-divisor pair $_m d, _m D$ is $l(_m d, _m D) = (20_m d/(2_m D+1))$. Since the higher of the two possible digits is used, the TQD is $t(_m d, _m D) = l(_m d, _m D) + 1$. The largest possible quotient digit is $h(_m d, _m D) = ((20_m d + 10)/2_m D)$. Accordingly, if $h(_m d, _m D) > t(_m d, _m D)$, then there are more than two possible quotient digits. Therefore, an adjustment must be made to the value of the TQD depending upon the values of the second, third and fourth digits of the divisor. Such an adjustment is made by incrementing the TQD value associated with that dividend/divisor pair. In the TQD table of FIG. 1, the range of divisor values associated with each TQD sub-table 7 is limited, so that only two TQDs are associated with each range of dividends within each TQD sub-table 7.

However, the TQD table can be generated having less than 13 TQD sub-tables, wherein certain TQDs within the TQD table can be adjusted when the divisor is within predefined ranges. For example, the TQD table may have only 10 TQD sub-tables, two associated with each distinct value of the lead divisor digit, as described above. Furthermore, the TQD table may include as few as 5 TQD sub-tables, one associated with each value of the lead divisor. The first TQD sub-table in such a TQD table would include 3 TQDs that require adjustment, the second TQD sub-table would require 4 TQDs to be adjusted, the third TQD sub-table would require 6 TQDs to be adjusted, the fourth TQD sub-table would require 4 TQDs to be adjusted, and the fifth TQD sub-table would require 3 TQDs to be adjusted.

This method for generating a TQD table holds true regardless of the number base for which the TQD table is generated. For example, if a TQD table were required for base 6 division, the divisor would be normalized to values greater than 6/2. The table would be created having lead divisor entries starting at 6/2, and ending with 6 - 1. The lead dividend entries would include lead digits from 0 through 6 - 1, and the next digit would be considered to determine whether that value is greater than or less than 6/2. The ranges of each TQD sub-table would be generated such that only two possible quotient digits exist for each dividend/divisor pair. If more than two quotient digits are possible, then the range of the TQD sub-table can be reduced, or the TQD associated with that pair can be adjusted. The same formulas presented above can be used to determine whether there are more than two possible quotient digits associated with each dividend/divisor pair.

Multiples Table

FIG. 2 is an illustration of a multiples table. Such a multiples table may be stored in an electronic memory means, such a RAM within a computer system. The entries to the multiples table are multiples of the divisor D, or the normalized divisor ND, if normalization is required. For the sake of simplicity, references to the "normalized divisor" ND can be assumed to also refer to divisors which do not require normalization. Each multiple is associated with a multiplier used to generate the multiple. For example, in row 2 the multiplier "2" is associated with the second multiple, which is equal to 2 times the normalized divisor ND. The multiples table is generated by repeatedly adding the value of the normalized divisor ND to itself, until the result equals 9 times the normalized divisor ND. Each time the normalized divisor ND is added, the result of the addition is preferably stored in the corresponding row in the table. For example, the first time that the normalized divisor ND is added to itself, the result is stored in row 2 (i.e., the row that corresponds with 2×ND). When the normalized divisor ND is added to the result of that addition, the result is stored in row 3 in the multiples table. This process continues until the multiples table is completed. Note that no addition operation is required to determine the values stored in the first two rows of the multiples table, since the value stored in row 0 is always zero, and the value in row 1 is always equal to the normalized divisor ND.

Each multiple can be initially generated in $8n$ move times and $8n$ add times for operands having n digits. It is typically most efficient to generate all multiples when numbers are represented as mantissas of floating point numbers and the dividend has many digits. In computers which lack decimal add and subtract instructions (such as most computers running UNIX), the add times can be quite slow. However, in data processing applications, the numbers are relatively short. In cases in which there are less than 3 digits in the dividend, several multiples will likely not be needed. Therefore, it is more efficient to generate the multiples as needed. Thus, for example, the sixth entry to the multiples table is generated only if there is a need for the sixth entry. However, in the process of calculating the sixth entry, intermediate values (i.e., the third, fourth, and fifth entries) must be calculated. Such intermediate values are stored in the appropriate rows in the table and are available if needed later in the operation. Any values stored in the multiples table may be used to calculate additional values. For example, if the fourth multiple and the second multiple were previously calculated, the sixth multiple can be calculated by adding the second multiple to the fourth multiple.

An efficient method for such "on-the-fly" computation of the Multiples Table values may be implemented by coding the following algorithm in a suitable computer language:

(1) To compute a required multiple $^m M$, sequentially perform the following tests:

(a) If $^m M$ exists, return;

(b) If $^{m-1}M$ exists, set $^m M = ^{m-1}M + ^1 M$ and return;

(c) If $^2 M$ does not exist, set $^2 M = ^1 M + ^1 M$ and continue;

(d) If $^{m-2}M$ exists, set $^m M = ^{m-2}M + ^2 M$ and return;

(e) If $^3 M$ and $^{m-3}M$ exists, set $^m M = ^3 M$ and $^{m-3}M$ and return;

(f) If $^4M$ does not exist, set $^4M=^2M+^2M$ and continue;

(g) If m is odd and $^{m-4}M$ does not exist, set $^{m-4}M=^{m-5}+^1M$ and continue;

(h) Set $^mM=^{m-4}M+^4M$ and return.

This algorithm does not perform any unnecessary add operations, and efficiently uses any previously generated multiples.

Inventive Procedure

Figure 3A:
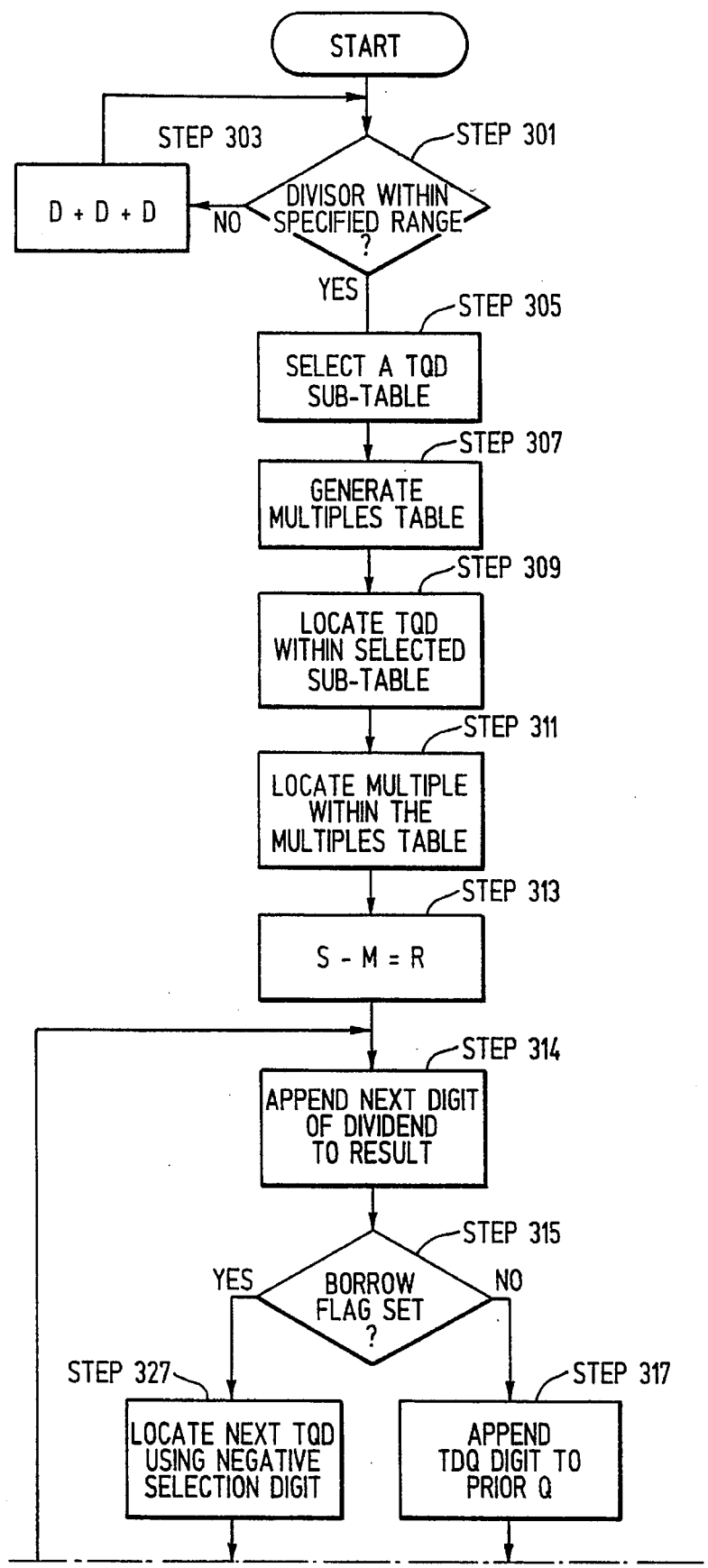
FIGS. 3A and FIG. 3B are a flowchart of the steps of the division process of the present invention.
Figure 3B:
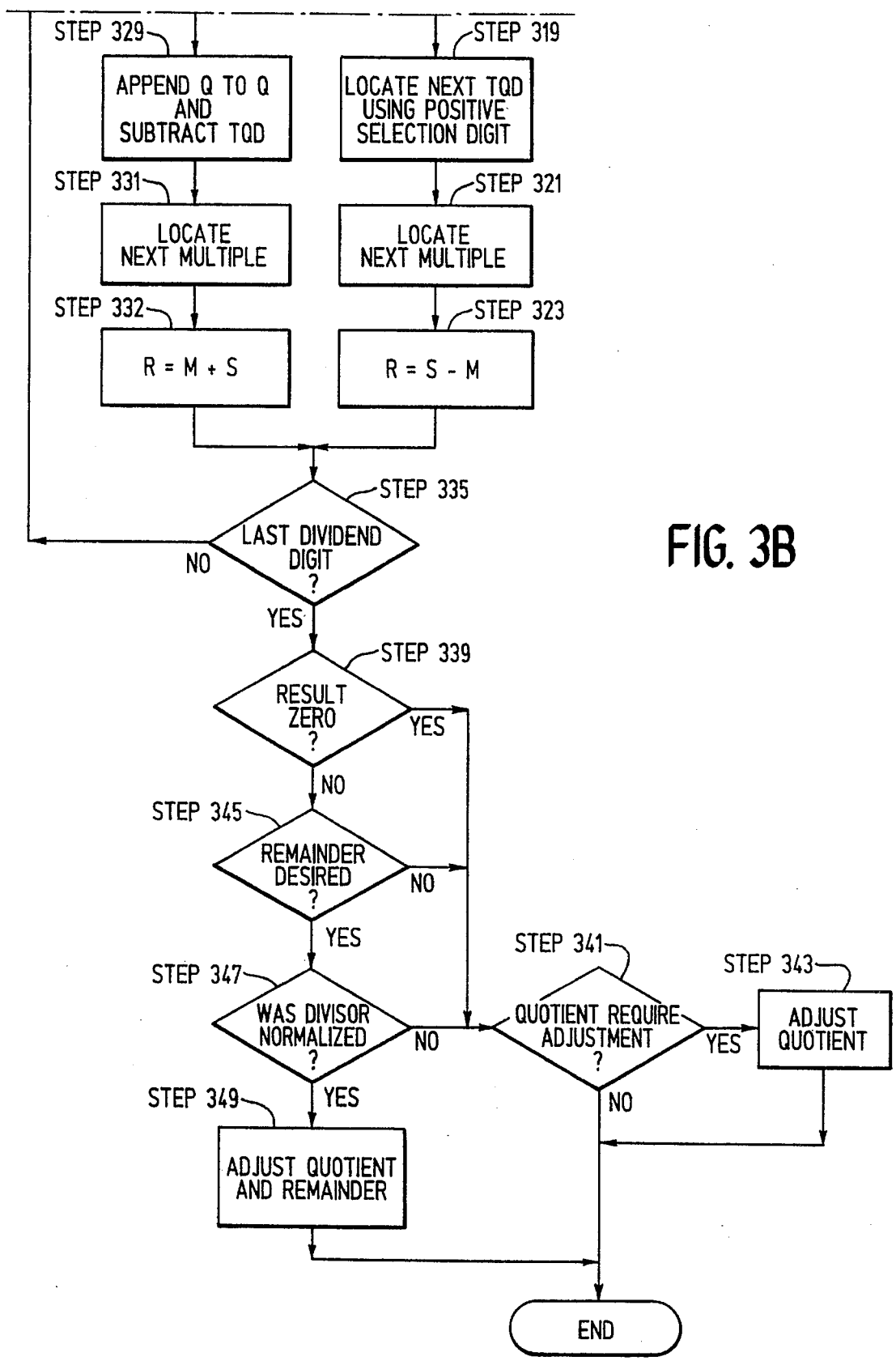

FIG. 3 is a flowchart of the steps required to perform a division operation in accordance with the present invention. While the process of the present invention is shown as being strictly sequential, it should be understood that "jump tables", "case" statements, and other more sophisticated decision making means may be used to determine the flow of the process without the need to individually and sequentially test each condition.

Initially, the first digit $D_1$ of the divisor D is inspected to determine whether normalization is required (STEP 301). If the divisor D is within a specified range, then no normalization is required. However, if the divisor D is not within the specified range, then the divisor D must be normalized by doubling the divisor D repeatedly until $D_1$ is within the specified range (STEP 303). In the preferred embodiment of the present invention, $D_1$ must be 5 or greater. Also, in the preferred embodiment, each time the divisor D is doubled, that value is retained for later use during the quotient and remainder adjustment process, which is explained in detail below.

Doubling is most easily accomplished by simply adding D to D. The maximum number of times the divisor D need be doubled is 3, since if the first digit is "1" (i.e., the case in which the greatest number of steps are required to normalize the divisor D), then the first doubling results in the first digit being equal to "2". The next doubling results in the first digit being equal to "4". By the third doubling, the first digit is equal to "8", which is greater than 5.

Next, a TQD sub-table 7 is selected (STEP 305). The TQD sub-table is selected by matching the lead divisor digit $ND_1$ to the digit in the first column 1 of the TQD table. Then, the next digits $ND_2$–$ND_4$ are matched to the ranges indicated in the second column 3 of the TQD table. If ND comprises less than 4 digits, then place holding phantom zeros are used in place of those digits that are not present. For example, if ND comprises only three digits, the first digit $ND_1$ is "6" and the next two digits $ND_2$, $ND_3$ are "2" and "9", respectively, then a place holding phantom zero is used in place of the missing $ND_4$. With these values (i.e., "6" and "290"), the sub-table 7 associated with the lead divisor digit "6" in column 1 of the TQD table and the range ≧250 to <500 of column 3 of the TQD table is selected. In this case, the selected sub-table 7 comprises the values "1 1 2 3 4 4 5 6 7 7 8 9 9".

The next step, in accordance with one embodiment of the present invention, is to generate a multiples table, such as the table shown in FIG. 2 (STEP 307). If the multiples table is to be precalculated, then after completion of the multiples table, the first TQD is located within the TQD sub-table 7 is selected in STEP 305 (STEP 309). Two values in the TQD sub-table 7 are associated with each positive selection digit 9 and each negative selection digit 11 within the TQD sub-table 7. Initially, the value of the first digit $d_1$ of the dividend d is matched to a positive selection digit 9. Two paired values associated with the positive selection digit 9 that matches the first digit $d_2$ are thus selected from the TQD sub-table 7. The value of the second digit $d_2$ of the dividend d is compared to the value "5". If the second digit of the dividend $d_2$ is less than "5", then the first, or left, value is selected as the TQD. If the second digit $d_2$ is greater than or equal to "5", then the second, or right, value is selected as the TQD. (Of course, the relative position of pairs of TQD values within the TQD table 7 may be reversed if the inequalities 13 are reversed).

The next step is to select the multiple associated with the selected TQD from the multiples table (STEP 311). The TQD value can be used as a direct pointer to the corresponding multiple. For example, if the TQD is "5", then the multiple in row 5 of the multiples table (i.e., 5× ND) is associated with the TQD. The multiple associated with the TQD is then subtracted from a portion of the dividend d to obtain a result R (STEP 313). The subtraction is performed by aligning the first digit $^mM_1$ of the multiple $^mM$ with the first digit $d_1$ of the dividend d if the first digit $^mM_1$ of the multiple $^mM$ is larger than the first digit $d_1$ of the dividend d; otherwise, the first digit $^mM_1$ of the multiple $^mM$ is aligned with the second digit $d_2$ of the dividend d. The aligned portion of the dividend may be considered a sub-dividend S. Once the dividend d and the multiple $^mM$ are properly aligned, the right-most (or most significant) digit of the multiple $^mM$ is subtracted from the digit of the sub-dividend S with which the right-most digit is aligned. If a borrow is required (i.e., if a digit of the multiple is greater than a digit of the dividend), then the next digit to the left of the sub-dividend S is decremented. This process continues in convention fashion from right to left until each digit of the multiple $^mM$ has been subtracted from a digit of the sub-dividend S. If the subtraction of the last (i.e., the left-most) digit of the multiple $^mM_1$ requires a borrow, then a borrow flag is set which indicates that the multiple $^mM_p$ was greater than the sub-dividend S. Using ten's compliment arithmetic in performing the subtraction, the lead digit of the result R will be either a "9" or "0". The lead digit of the result R is used only to indicate whether the result R is positive or negative. Sign, borrow, and overflow flags are otherwise ignored. The next digit of the dividend d is then appended to the least significant digit of the result R to obtain a new sub-dividend S (STEP 314).

A determination may be made as to whether the result R is positive or negative by either checking the state of the borrow flag, or by determining whether the lead digit of the result R is zero. If the lead digit of the result R is zero (STEP 315), then the selected TQD is the actual quotient digit, and is appended to any previously determined quotient digits as a next least significant digit (STEP 317). The next TQD is selected by matching the value of the first digit of the new sub-dividend S to the positive selection digits 9 in the TQD sub-table 7, and determining which of the two entries to the TQD sub-table 7 are to be selected (STEP 319). If the value of the second digit of the sub-dividend S is less than "5", then the left entry is selected. If the value of the second digit of the sub-dividend S is greater than, or equal to, "5", then the right entry is selected. Next, the multiple $^mM$ within the multiples table that is associated with the selected TQD is selected (STEP 321). The selected multiple $^mM$ is then subtracted from the previous sub-dividend S (STEP 323). If the last dividend digit n has not been processed (STEP 335), then the process is continued from STEP 314, wherein the next digit of the dividend d is appended to the result R to generate a new sub-divisor S.

If the lead digit of the result R tested in STEP 315 is not zero, then the actual quotient digit is equal to the TQD minus 1. If a borrow flag is used to determine whether the result R is positive or negative, then once the borrow flag has been set, the borrow flag remains set until a subsequent addition of a multiple M to a sub-dividend S results in an overflow condition. In the preferred embodiment of the present invention, the current quotient Q is adjusted (i.e., the next quotient digit corresponding to the most recent result R will be added to the quotient Q) using the next TQD. The next TQD is selected by matching the value of the first digit of the sub-dividend S to the negative selection digits 11 in the TQD sub-table 7 (STEP 327). A determination as to which of the two entries associated with the negative selection digit 11 are to be selected is made based upon whether the value of the second digit of the sub-dividend S is less than "5". If so, then the right entry is selected. If the value of the second digit of the sub-dividend S is greater than, or equal to, "5", then the left entry is selected. That is, the inequalities 15 are the reverse of the inequalities 13.

Using this new TQD, the partial quotient Q is adjusted by subtracting the TQD from the least significant digit of the partial quotient Q after a zero has been appended as the least significant digit of the partial quotient Q (STEP 329). That is, if the partial quotient Q is "671", the prior result R was negative (i.e., the lead digit of the result R was not zero, or the borrow flag is set), and the new TQD is "9", then the partial quotient Q is adjusted to equal 6710 minus 9, or 6701. This correction to the quotient Q in effect corrects for the fact that the prior TQD was one unit too large, and causes the ten's compliment of the TQD to be appended to the prior quotient digits. This correction could be achieved by any other means for decrementing the least significant digit of the prior quotient and appending the ten's compliment of the TQD.

Next, the multiple $^mM$ within the multiples table that is associated with the value from the TQD table is selected (STEP 331). For example, if the value selected from the TQD table was "4", the multiple in row 4 (i.e., 4×ND) is selected from the multiples table. The selected multiple $^mM$ is then added to the previous sub-dividend S. An overflow condition will reset the borrow flag. If the last dividend digit $D_n$ has not been processed (STEP 335), then the procedure continues from STEP 314.

On computers with a right hand sign, care must be taken to assure that intermediate results are always positive so that embedded signs do not occur (i.e., the programmer must determine whether or not a quantity has become negative. This is unnecessary if ten's compliment arithmetic is employed).

If the last digit $D_n$ has been processed (STEP 335), then the quotient may need to be adjusted if the result R was negative, as indicated by either the lead digit of the result R being non-zero, or a borrow flag being set as a result of a subtraction and no subsequent addition caused an overflow condition. Such adjustment will also depend upon whether the divisor D was normalized. The adjustment process is described in detail below.

The final result R is tested to determine whether there is a remainder. First, if the result R is zero, then there is no remainder (STEP 339). If the divisor D was not normalized and the quotient does not require adjustment, as indicated by the borrow flag not being set, or the lead digit of the result R being zero (STEP 341), then the procedure is complete and no further action is taken. However, if (1) the divisor D was normalized, (2) the last operation was a subtraction and the lead digit of the result R was non-zero, or borrow flag was set, or (3) the last operation was an addition operation and an overflow condition did not occur to reset the borrow flag, then the quotient must be adjusted (STEP 343). If the divisor D was not normalized, then the quotient is adjusted by simply decrementing the quotient by one. After the quotient is adjusted, the procedure is complete. Adjustment in the case in which normalization was performed on the divisor D is discussed in detail below.

If the result R was not zero in STEP 339, then a decision must be made as to whether the remainder is desired (STEP 345). If the remainder is not desired, then the process proceeds from STEP 341. Otherwise, if the divisor D was not normalized (STEP 347) and the quotient does not require adjustment, as indicated by the lead digit of the result R being zero, or the borrow flag not being set (STEP 341), then the procedure is complete and no further action is taken. However, if the last operation was a subtraction and the lead digit of the result R was non-zero, or the borrow flag was set, or the last operation was an addition operation which did not result in an overflow condition (STEP 341), then the quotient must be adjusted (STEP 343). After the quotient is adjusted, the procedure is complete.

If the divisor D was normalized (STEP 347) and then both the remainder and the quotient Q must be adjusted (STEP 353). After the quotient and remainder are adjusted, the procedure is complete.

Adjustment Process

After the last digit of the dividend $d_i$ has been processed, the current result R may be negative. In that case, more addition operations are required to correct the last TQD. If the divisor D has not been normalized, then the divisor D is adjusted by decrementing the last TQD by one, and the remainder is adjusted by adding the divisor D to the result R. If the divisor D has been normalized, then the remainder must also be adjusted, since it may actually exceed the divisor D. Therefore, the correction is postponed until the remainder has been generated. The original divisor D may have been doubled 1, 2, or 3 times. Each double of the divisor D is saved. For instance, if the original divisor D was between 1 and 1.25, then the multiples D, 2D, 4D, and 8D would be saved. The multiple 8D is ignored. If the current result R after the last digit of the dividend d/is processes is negative, 4D is added to the result R. The quotient Q is then doubled and decremented by one.

If the divisor has been normalized, and the current result R is positive after the last digit $D_n$ has been processed (i.e., the lead digit of the result R was zero, or the borrow flag is not set), then 4D is subtracted from the current result R. The quotient Q is doubled and incremented by one. This process is repeated using 2D, and then D. Finally, if the last result R is negative (i.e., the lead digit of the result R was non-zero, or the borrow flag is set), the divisor D is added to the result R and one is subtracted from the quotient Q. If the addition causes an overflow condition, the borrow flag is reset.

Figure 4:
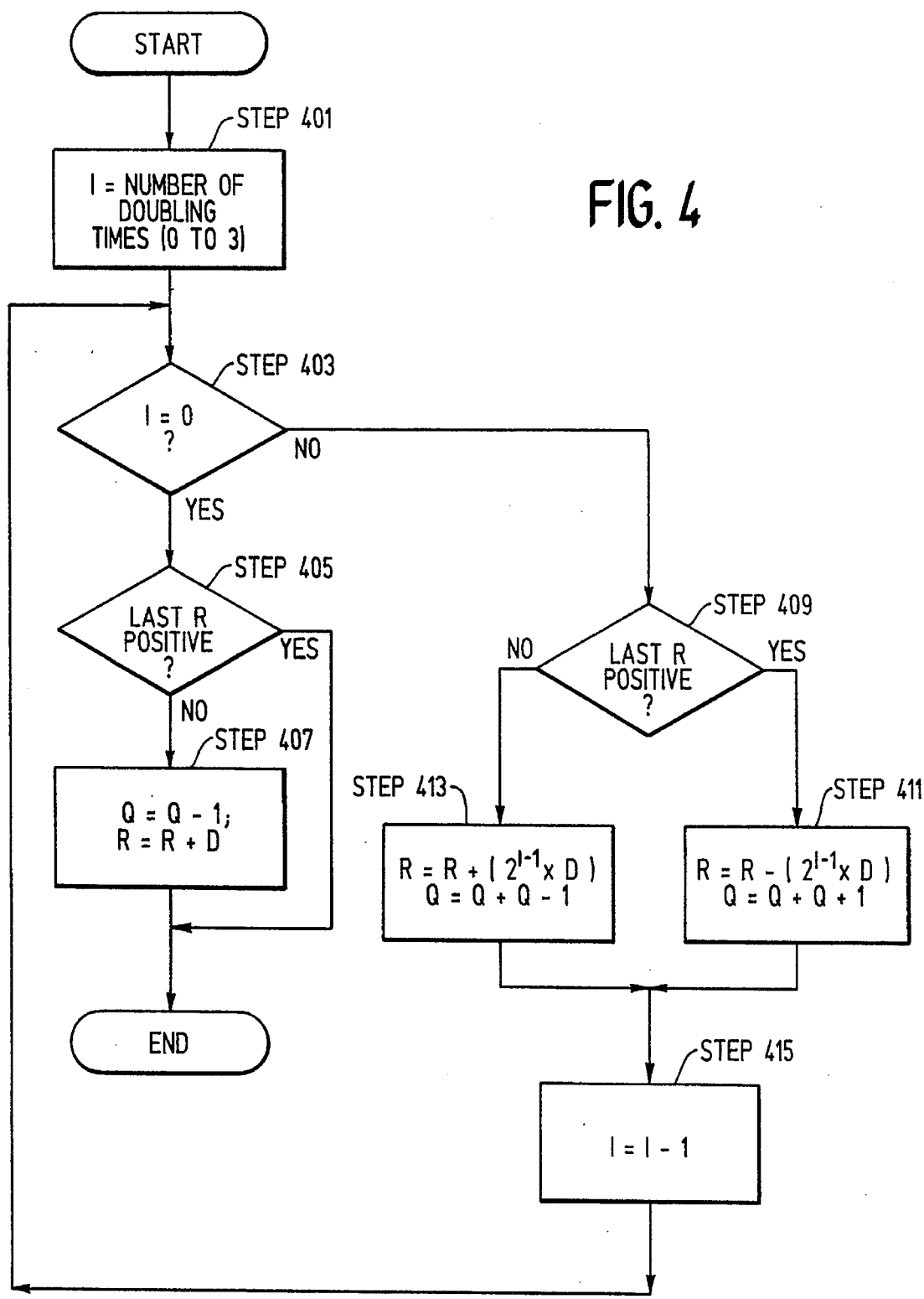
FIG. 4 is a flowchart of the steps of the quotient and remainder adjustment process of the present invention.

FIG. 4 is a flow chart of the steps performed to adjust the quotient and remainder if the divisor D was normalized. As stated above, while the inventive process is shown as being strictly sequential, it should be understood that "jump tables" and other more sophisticated decision making means may be used to determine the flow of the process without the need to individually and sequentially test each condition.

The adjustment procedure can be performed as shown by the flowchart in FIG. 4. In accordance with the flowchart in FIG. 4, a variable "1" is set to the number of times the divisor has been doubled (STEP 401). If I equals zero (STEP 403), then a determination is made as to whether the last result R was positive (STEP 405). If the last result R was positive, then the process ends. Otherwise, one is subtracted from the quotient, and the divisor is added to the result R (STEP 407). The procedure then ends. If the value of I is not zero in STEP 403, then the sign of the last result R determined (STEP 409). In either case the result R and the quotient Q are adjusted. If the last result R was positive, then the adjusted result is equal to the result R minus ($2^{l-1} \times D$). The adjusted quotient Q is equal to double the quotient plus 1 (STEP 411). Next, I is decremented by one.

If the last result R was not positive in STEP 409, then the adjusted result is result R plus ($2_{i-1} \times D$) and the adjusted quotient is equal to the quotient Q doubled minus 1 (STEP 413). Next, 1 is decremented (STEP 415).

The procedure returns from STEP 415 to STEP 403, and continues until I reaches zero and the procedure leads to the end, as described above.

Example

The following is an example of a division operation performed in accordance with one embodiment of the present invention. For this example, the value 1248604 will be divided by 203. Thus, d=1248604 and D=203. In the preferred embodiment, the first digit of the divisor must not be less than "5". In the example, the first digit of the divisor D is less than "5". Therefore, the divisor D must be normalized. The divisor D is doubled to a value of "406". The first digit is again found to be less than "5". Therefore, the divisor D is again doubled to a value of "812". Since the first digit is now greater than "4", the value "812" becomes the normalized divisor ND. Next, a TQD sub-table is selected from the TQD table shown in FIG. 1. The first digit of the normalized divisor ND is "8". Therefore, the selection is narrowed to either the 10th or the 11th sub-table. The next digit of the normalized divisor ND is "1". Since this value is less than 5, the 10th sub-table is selected. The 10th sub-table comprises the values "1, 1, 1, 2, 3, 3, 4, 4, 5, 6, 6, 7, 8, 8, 9, 9, 9".

In the present example, a multiples table is generated as the values in the table are required. Next, the first TQD is located within the selected TQD sub-table. The first digit of the dividend determines which pair of potential TQDs are of interest. In this example, the first digit is "1". Therefore, the pair of interest lies within the TQD sub-table selected 7 in the row under the positive selection digit 9 having the value "+1". The pair includes the values 1 and 2. Since the second digit of the dividend is "2" (i.e., less than "5"), the first value of the pair, "1", is selected as the TQD. Therefore, the first multiple of the normalized divisor ND (i.e., 1×ND=812) is subtracted from a sub-dividend S portion of the dividend d. Since the first digit of the multiple is greater than the first digit of the dividend $d_1$, the first digit of the multiple is aligned with the second digit of the dividend $d_2$, as shown below. After the result R of the subtraction is attained, the next digit of the dividend d, which in this example is "6", is appended to the result R to generate a sub-dividend S. The subtraction did not require a borrow. Therefore, the TQD value "1" is the actual quotient digit. Since no other quotient digits have yet been determined, the first TQD becomes the quotient Q.

The first digit of the sub-dividend S is "4" and the second digit is less than "5". Therefore, the next TQD is "5".

The fifth multiple (i.e., 5×ND=4060) is then subtracted from the sub-dividend S. The next digit of the dividend d is appended to the result R to generate the next sub-dividend S. No borrow is required for the subtraction. Therefore, "5" is the actual second digit of the quotient Q and is appended to the prior quotient Q. The next TQD is then selected. Since the first digit of the sub-dividend S is "3" and the second digit is "0", the selected TQD is "4". The fourth multiple (i.e., 4×ND=3248) is subtracted from the sub-dividend S "3060". After the result R of the subtraction is attained, the next digit of the dividend d, which in this example is "0", is appended to the result R. Since the subtraction requires a borrow, the selected TQD is not the actual third digit of the quotient Q. Therefore, the lead digit of the result R is non-zero, or the borrow flag is set.

Since the lead digit of the result R is non-zero, or the borrow flag is set, the next TQD is selected using the negative selection digits 11 in the TQD sub-table. Since the first digit of the sub-dividend S is "8" and the second digit of the sub-dividend S is less than "5", the value "2" is selected from the TQD sub-table. A zero is appended to the right of the current quotient "154" and the TQD value of "2" is subtracted to obtain the adjusted quotient "1538". Since the value selected from the TQD sub-table is "2", the second multiple (i.e., 2×ND=1624) is added to generate a final result R "9748". There are no further digits in the dividend d to be appended to the result R. Therefore, the division process ends. If there were more digits in the dividend, then the next digit of the dividend d would be appended to the result R. However, the most significant digit of the result R (i.e., the "9") would only be used to determine whether an overflow condition occurred or not (which could also be determined by a carry flag, if present). The first digit of the result R which would be used to select the next TQD from the TQD sub-table would be the value "7". Furthermore, a zero would be appended to the quotient Q and the next TQD subtracted therefrom. However, since In this example there are no more digits in the dividend d, the division process has ended and a determination must be made as to what further adjustments, if any, are required, and whether the reminder is to be calculated.

If a remainder is desired, then since the result R is not zero and the divisor D was normalized, an adjustment process must be performed. The divisor was normalized by being doubled twice (i.e., I=2) and the last result R was not positive. Therefore, the quotient Q is doubled and then decremented by one, and ($2^{2-1}$×D) is added to the result R "9748". The variable/is then decremented to a value of 1. The result R "154" is now positive, since an overflow condition occurs upon adding 406 to 9748. Therefore, this completes the adjustment process. Thus, the quotient is equal to "6150" with a remainder of "154".

| | BEGINNING OF DIVISION | |
|---|---|---|
| | TQD | Q |
| 1248604<br>−812 | 1 | 10 (append 0 to Q) |
| 4366<br>−4060 | +5 | +5 (add next TQD)<br>15 |
| 3060<br>−3248 | +4 | 150 (append zero to Q)<br>+4 (add next TQD) |
| 98124<br>+1624 | −2 | 1540 (append 0 to Q) lead digit "9",<br>borrow flag set;<br>−2 (subtract next TQD) |
| 9748<br>END OF DIVISION | | 1538 carry flag not set; |

| | BEGINNING OF ADJUSTMENT | |
|---|---|---|
| | ×2 | double Q; |
| | 3076<br>−1 | decrement by 1; |
| 9748<br>+406 | 3075 | add 2 times D to last result R; |
| 0154 | ×2 | carry flag set;<br>double Q; |
| 6150<br>END OF ADJUSTMENT | | |

Conclusion

The preferred embodiment of the present invention is implemented as a common programmable computer which executes instructions to cause the above described steps to be performed.

The present invention allows a quotient to be computed very efficiently by limiting the number of operations required to identify the value of each quotient digit (i.e., each quotient digit is positively identified with a single addition or subtraction operation). Thus, the present invention provides fast long division operations in computers which do not have single operation division or multiplication instructions available. This is a significant advance over the prior art which requires more than one addition or subtraction operation to positively identify each digit of a quotient. In particular, the present invention allows a quotient for an n digit divisor to be generated in exactly n steps (after normalization), as in multiplication. The only important variable in this algorithm is how many times the divisor is doubled during normalization. Following the calculation provided in THE ART OF COMPUTER PROGRAMMING, Vol. 3, Addison Wesley, Mass., 1973, and assuming that the probability that $a \leq x < b$ is $\log(b)-\log(a)$, the expected number of times the divisor is doubled is: $3(\log1.25-\log1)+2(\log5-\log1.25)+(\log5-\log2.5)=3-6\log2 \approx 1.2$.

Each double of the divisor is an n+n digit add and requires one n+n double of the quotient and one n+n add to the remainder for a total of 3(n+n) (i.e., 6n) digit adds. For the above calculation, it can be assumed that, on average, the divisor is doubled 1.2 times. Therefore, normalization of the divisor requires 1.2×6$n$ digit adds (i.e., 7.2$n$ digit adds). If it is assumed that positive and negative intermediate results are equally likely, and the multiples are all generated initially, then the number of digit add times are:

compute multiples of divisor . . . . . . . . . . . . . . . . . 32$n$ digit adds compute unadjusted quotient and remainder . . . 2$n^2$ digit adds compute adjusted quotient and remainder . . . . 7.2$n$ digit adds computation for negative result . . . . . . . . . . . . . . 2$n$ digit adds for a total of $n(2n+41.2)$ digit add times.

The $n^2$ term is expected, however, the coefficient of 2 occurs because the analysis is oriented to two address instructions (e.g., the IBM System/36) such as "add a to b". Using three address instructions (add a to b and put it in c), this coefficient would be 3.

A number of embodiments of the present invention have been described. Nevertheless, it will be understood that various modifications may be made without departing from the spirit and scope of the invention. For example, the divisor may be normalized by multiplying the divisor by values other than 2 to bring the divisor within a specified range. Furthermore, the specified range may be other than described above. Still further, the values in the TQD table may vary if the normalization range is altered. Additionally, the base of the numbers being operated on may vary, causing the TQD table to vary. Furthermore, the value of the first digit of the dividend d could be used to reduce the number of TQDs that are to be considered for selection (i.e., eligible TQDs) from the TQD table of FIG. 1. The value of the second digit of the dividend d could then be used to further reduce the number of eligible TQDs. Then, by using the value of the first digit of the normalized divisor ND the number of eligible TQDs could be reduced to less than 4. Finally, by using the value of no more than 3 additional digits of the dividend d, the number of eligible TQDs could be reduced to one. This alternative embodiment would not use the concept of a TQD sub-table. Accordingly, it is to be understood that the invention is not to be limited by the specific illustrated embodiment, but only by the scope of the appended claims.

I claim:

1. A computer apparatus for generating a quotient from a normalized divisor and a dividend, comprising:
   (a) a data storage system; and
   (b) at least one processor, coupled to the data storage system, and programmed to perform the following functions:
      (1) storing a trial quotient digit (TQD) table in the data storage system;
      (2) generating a current sub-dividend from the dividend;
      (3) selecting a TQD from the stored TQD table using at least the first and second digits of the current sub-dividend, and the first and second digits of the normalized divisor;
      (4) storing in the data storage system multiples of the normalized divisor, each multiple corresponding to a unique TQD value;
      (5) selecting the multiple corresponding to each selected TQD;
      (6) mathematically combining the selected multiple with the current sub-dividend to derive a result which is indicative of whether a current TQD is an actual quotient digit;
      (7) defining a first selected TQD as a partial quotient, and thereafter appending each selected TQD to the partial quotient; and
      (8) correcting the partial quotient in one computational operation if the current TQD is not the actual quotient digit.

2. A computer apparatus for generating a quotient from a normalized divisor and a dividend, comprising:
   (a) a storage system; and
   (b) a computer processor programmed to perform the following functions:
      (1) storing a trial quotient digit (TQD) table within the data storage system;
      (2) generating a current sub-dividend from the dividend;
      (3) selecting a current TQD from the stored TQD table using the normalized divisor and the current sub-dividend;
      (4) storing in the data storage system multiples of the normalized divisor, each multiple corresponding to a unique TQD value;
      (5) selecting the multiple corresponding to the current selected TQD;
      (6) either adding the current selected multiple to, or subtracting the current selected multiple from, the current sub-dividend to derive a result;
      (7) generating a partial quotient from the current selected TQD, including appending the current selected TQD to the partial quotient, decrementing the current TQD only once, and appending to the partial quotient the ten's complement of a next selected TQD selected from the TQD table using the normalized divisor and the result of the addition or subtraction of step (6), if:
         (i) the multiple corresponding to the current selected TQD is subtracted from, and is greater than, the sub-dividend; or
         (ii) the multiple corresponding to the current selected TQD is added to the sub-dividend and the sum does not cause a carry condition;
otherwise generating a partial quotient from the current selected TQD and the next selected TQD by appending the current selected TQD and the next selected TQD to the partial quotient.

3. A computer apparatus for generating a quotient from a divisor and a dividend, comprising:

(a) a storage system; and (c) a computer processor programmed to perform the following functions:

(1) generating a normalized divisor from the divisor, such that the first digit of the normalized divisor is greater than or equal to 5;

(2) generating a sub-dividend;

(3) storing a trial quotient digit (TQD) table in the data storage system;

(4) selecting a current TQD from the stored TQD table using the normalized divisor and the sub-dividend;

(5) generating and storing in the data storage system multiples of the normalized divisor, each multiple corresponding to a unique TQD value;

(6) selecting the multiple corresponding to the current TQD;

(7) either adding the selected multiple to, or subtracting the selected multiple from, the sub-dividend;

(8) generating a partial quotient, including adjusting the partial quotient by decrementing the least significant digit of the partial quotient only once and appending the ten's complement of the current TQD to the partial quotient if:

(i) the multiple corresponding to a last selected TQD is to be subtracted from, and is greater than, the sub-dividend, or (ii) the multiple corresponding to the last selected TQD and the current sub-dividend are to be added, and the sum does not cause a carry condition; and otherwise appending the current selected TQD to the partial quotient.

4. The apparatus of claim 3, wherein the computer processor is programmed such that the computer processor adjusts the partial quotient by appending a zero to the quotient and then subtracting the current TQD from the partial quotient if:

(a) the multiple corresponding to the last selected TQD is to be subtracted from, and is greater than, the sub-dividend, or (b) the multiple corresponding to the last selected TQD and the current sub-dividend are to be added, and the sum does not cause a carry condition; and the multiple corresponding to the last TQD is greater than the sub-dividend from which the selected multiple is to be subtracted; and otherwise appending the selected TQD to the partial quotient.

5. The apparatus of claim 3, wherein computer processor is programmed such that the computer processor performs each of the following additional functions:

(a) using the first digit of the normalized divisor to reduce the number of TQDs eligible for selection;

(b) using at least the second digit of the normalized divisor to further reduce the number of eligible TQDs;

(c) using the first digit of the dividend to still further reduce the number of eligible TQDs to two; and (d) using the second digit of the dividend to yet further reduce the number of eligible TQDs to one.

6. The apparatus of claim 3, wherein the computer processor is programmed such that the computer processor performs each of the following additional functions:

(a) using the first digit of the dividend to reduce the number of TQDs eligible for selection;

(b) using the second digit of the dividend to further reduce the number of eligible TQDs;

(c) using the first digit of the normalized divisor to still further reduce the number of eligible TQDs to less than four; and (d) using at least the second digit of the dividend to yet further reduce the number of eligible TQDs to one.

7. The apparatus of claim 3, wherein the computer processor is programmed such that the computer processor adds the divisor to itself repeatedly until the first digit of the divisor is greater than or equal to 5.

8. The apparatus of claim 3, wherein the computer processor is programmed such that the computer processor performs each of the following additional functions:

(a) determining if $^mM$ exists;

(b) setting $^mM=^{m-1}M+^mM$, if $^{m-1}M$ exists;

(c) setting $^2M=^1M+^1M$, if $^2M$ does not exist;

(d) setting $^mM=^{m-2}M+^2M$, if $^{m-2}M$ exists;

(e) setting $^mM=^3M$ and $^{m-3}M$, if $^3M$ and $^{m-3}M$ exists;

(f) setting $^4M=^2M+^2M$, if $^4M$, if $^4M$ does not exist;

(g) setting $^{m-4}M=^{m-5}M+^1M$, if m is odd and $^{m-4}M$ does not exist;

(h) setting $^mM=^{m-4}M+^4M$;

wherein $^mM$ is the mth multiple of the normalized divisor.

9. The apparatus of claim 3, wherein the computer processor is programmed such that the computer processor performs each of the following additional functions for generating a sub-dividend:

(a) aligning the most significant digit of the selected multiple with the most significant digit of the dividend if the most significant digit of the dividend is greater than the most significant digit of the selected multiple, and otherwise with the second most significant digit of the dividend; and (b) appending a digit of the dividend to the result of the subtraction of the selected multiple from a previously generated sub-dividend to generate a new sub-dividend.

10. The apparatus of claim 3, further including a borrow flag which is set if a borrow condition occurs when the selected multiple is subtracted from the sub-dividend, and which is reset if an overflow condition occurs when the selected multiple is added to the sub-dividend.

11. A computer method of generating a quotient from a normalized divisor and a dividend, in a computer comprising a data storage system, and at least one processor, coupled to the data storage system, the method including the steps of:

(a) storing a trial quotient digit (TQD) table in the data storage system;

(b) generating a current sub-dividend from the dividend;

(c) selecting a TQD from the stored TQD table using at least the first and second digits of the current sub-dividend, and the first and second digits of the normalized divisor;

(d) storing multiples of the normalized divisor, each multiple corresponding to a unique TQD value;

(e) selecting the multiple corresponding to each selected TQD;

(f) mathematically combining the selected multiple with the current sub-dividend to derive a result which is indicative of whether the selected TQD is an actual quotient digit;

(g) defining a first selected TQD as a partial quotient, and thereafter appending each selected TQD to the partial quotient; and (h) correcting the partial quotient in one computational operation if the selected TQD is not the actual quotient digit.

12. A computer method of generating a quotient from a normalized divisor and a dividend, in a computer comprising a data storage system, and at least one processor, coupled to the data storage system, the method including the steps of:

(a) storing a trial quotient digit (TQD) table;

(b) generating a current sub-dividend from the dividend;

(c) selecting a current TQD from the stored TQD table using the normalized divisor and the current sub-dividend;

(d) storing multiples of the normalized divisor, each multiple corresponding to a unique TQD value;

(e) selecting the multiple corresponding to the current TQD;

(f) either adding the current selected multiple to, or subtracting the current selected multiple from, the current sub-dividend to derive a result;

(g) generating a partial quotient from the current TQD, including decrementing the last digit appended to the partial quotient only once and appending the ten's complement of the current TQD to the partial quotient if:

(1) the multiple corresponding to a last selected TQD is to be subtracted from, and is greater than, the sub-dividend; or (2) the multiple corresponding to the last selected TQD is to be added to the sub-dividend and the sum does not cause a carry condition; otherwise appending the current TQD to the partial quotient.

13. A computer method of generating a quotient from a normalized divisor and a dividend, in a computer comprising a data storage system, and at least one processor, coupled to the data storage system, the method including the steps of:

(a) generating a normalized divisor from the divisor, such that the first digit of the normalized divisor is greater than or equal to 5;

(b) generating a sub-dividend;

(c) storing a trial quotient digit (TQD) table;

(d) selecting a TQD from the stored TQD table using the normalized divisor and the sub-dividend;

(e) generating and storing multiples of the normalized divisor, each multiple corresponding to a unique TQD value;

(f) selecting the multiple corresponding to the selected TQD;

(g) either adding the selected multiple to, or subtracting the selected multiple from, the sub-dividend;

(h) generating a partial quotient, including adjusting means for adjusting the partial quotient by decrementing the least significant digit of the partial quotient only once and appending the ten's complement of the selected TQD to the partial quotient if:

(1) the multiple corresponding to a last selected TQD is to be subtracted from, and is greater than, the sub-dividend, or (2) the multiple corresponding to the last selected TQD and the current sub-dividend are to be added, and the sum does not cause a carry condition; and otherwise appending the selected TQD to the partial quotient.

* * * * *